United States Patent
Matsuo et al.

(10) Patent No.: US 6,705,115 B2
(45) Date of Patent: Mar. 16, 2004

(54) SYNTHETIC QUARTZ GLASS AND PRODUCTION PROCESS

(75) Inventors: Koji Matsuo, Nakakubiki-gun (JP); Hisatoshi Otsuka, Nakakubiki-gun (JP); Kazuo Shirota, Nakakubiki-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 452 days.

(21) Appl. No.: 09/747,953

(22) Filed: Dec. 27, 2000

(65) Prior Publication Data

US 2001/0018834 A1 Sep. 6, 2001

(30) Foreign Application Priority Data

Dec. 27, 1999 (JP) ............................................. 11-371458

(51) Int. Cl.$^7$ ............................................... C03B 19/14
(52) U.S. Cl. .......................... 65/17.4; 65/17.6; 65/397; 65/414; 65/416
(58) Field of Search ................................. 65/17.4, 17.6, 65/414, 416, 397; 501/54

(56) References Cited

U.S. PATENT DOCUMENTS

| 4,940,477 A | * | 7/1990 | Bocko et al. ................. 65/17.4 |
| 5,325,230 A | | 6/1994 | Yamagata et al. |
| 5,326,729 A | | 7/1994 | Yaba et al. |
| 5,735,921 A | * | 4/1998 | Araujo et al. ................. 65/32.1 |
| 6,319,634 B1 | * | 11/2001 | Berkey et al. ................. 430/5 |
| 2002/0018942 A1 | * | 2/2002 | Brown et al. ................... 430/5 |
| 2002/0194869 A1 | * | 12/2002 | Borrelli et al. ............... 65/17.4 |

FOREIGN PATENT DOCUMENTS

| EP | 0 208 086 A1 | * | 1/1987 |
| EP | 0691312 A1 | | 1/1996 |

* cited by examiner

*Primary Examiner*—Sean Vincent
(74) *Attorney, Agent, or Firm*—Millen, White, Zelano, Branigan, P.C.

(57) ABSTRACT

A process for producing synthetic quartz glass using a burner composed of a plurality of concentric nozzles involves the steps of feeding a silica-forming raw material gas and a fluorine compound gas to a reaction zone from a center nozzle, feeding oxygen gas from a second nozzle outside the center nozzle, and feeding oxygen gas and/or hydrogen gas from a third nozzle. The silica-forming raw material gas is hydrolyzed to form fine particles of silica, which particles are deposited on a rotatable substrate so as to form a porous silica matrix, which is then fused to give the quartz glass. The flow rate of the oxygen gas fed from the second nozzle and the flow rate of the raw material gas are controlled so as to provide a 1.1- to 3.5-fold stoichiometric excess of oxygen. The excess oxygen suppresses Si—Si bond formation in the quartz glass, enabling the production of synthetic quartz glass having a high transmittance in the vacuum ultraviolet region.

18 Claims, 2 Drawing Sheets

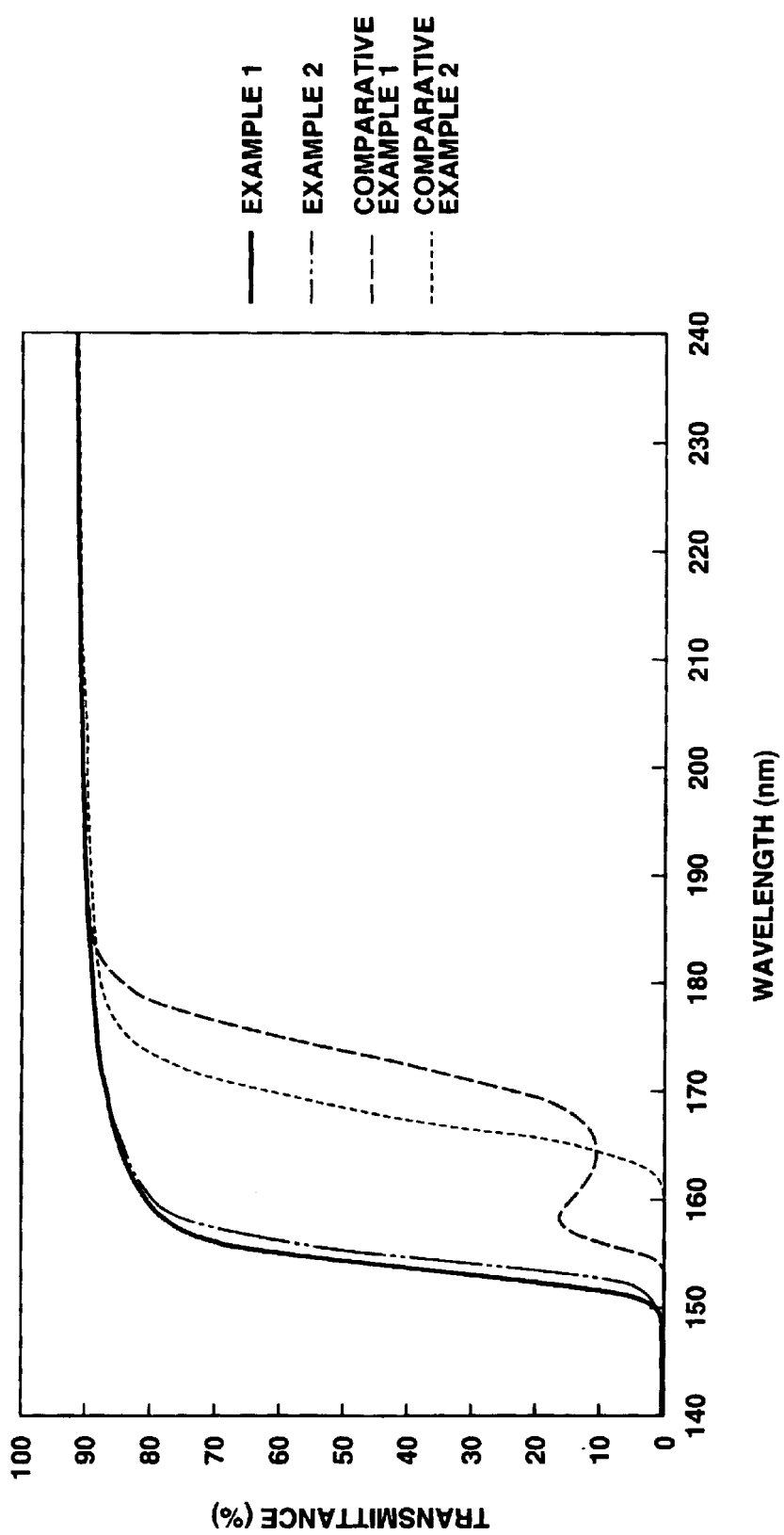

SYNTHETIC QUARTZ GLASS AND PRODUCTION PROCESS

BACKGROUND OF THE INVENTION

1. Field of the Invention

The present invention relates to synthetic quartz glass having a high transmittance to short-wavelength ultraviolet radiation, such as excimer laser light, and particularly in the vacuum ultraviolet region. The invention also relates to a process for producing such synthetic quartz glass.

2. Prior Art

Synthetic quartz glass, because of its low thermal expansion and its high purity and quality, is used in semiconductor manufacturing applications such as process tubes for heat treatment furnaces employed in silicon wafer oxidation and diffusion operations. In addition, it has a high transmittance to ultraviolet light, which makes it an indispensable material in lithography tools used to fabricate large scale integration (LSI) chips. The specific role of synthetic quartz glass in lithography tools includes its use as a stepper lens material and a reticle or photomask substrate material in the processes of circuit pattern exposure and transfer onto silicon wafers.

As LSI chips continue to become more versatile and higher performing, research and development is actively underway to increase the level of device integration on wafers. Achieving higher device integration requires a high optical resolution capable of transferring very fine patterns. The way to achieve a higher resolution is to shorten the wavelength of the light source. The wavelength of ultraviolet light from the light source primarily used today is 248 nm (KrF excimer laser), although efforts are being made to move to a wavelength of 193 nm (ArF) as quickly as possible. Ultraviolet light having a wavelength of 157 nm ($F_2$) also shows considerable promise, and may well see widespread use in the not-too-distant future.

Quartz glass is generally capable of transmitting ultraviolet light, but transmittance declines in the vacuum ultraviolet region below 200 nm and ceases altogether at wavelengths near 140 nm, which is an absorption region owing to the inherent structure of quartz glass. In the wavelength range above the inherent absorption region, there do exist absorption bands which arise on account of defect structures within the glass. Hence, there can be considerable differences in transmittance depending on the type and extent of defect structures. When quartz glass has a low transmittance at the wavelength used in a lithography tool, the absorbed ultraviolet light is converted to heat energy within the quartz glass. Irradiation thus causes compaction to occur at the interior of the glass, which makes the refractive index of the glass non-uniform. One consequence is that, if the defect structures within the quartz glass are strongly absorbing near the irradiation wavelength, this can lower the transmittance of the glass and also reduce its durability as a material used in lithography tools.

Typical defect structures in quartz glass include Si—Si bonds and Si—O—O—Si linkages. Si—Si bonds are sometimes called "oxygen deficiency defects," and have absorption bands at 163 nm and 245 nm. Because such oxygen deficiency defects are also precursors of Si. defect structures (E' centers) which have an absorption band at 215 nm, they cause serious problems not only when $F_2$ (157 nm) is used as the light source, but also with the use of KrF (248 nm) or ArF (193 nm).

Si—O—O—Si linkages are known as "oxygen surplus defects," and have an absorption band at 325 nm. In addition, Si—OH bonds and Si—Cl bonds exhibit absorption bands near 160 nm. It is therefore important in producing quartz glass having a high transmittance in the vacuum ultraviolet region to suppress the formation of oxygen deficiency defects, and also to hold the hydroxyl groups and chloride groups to low concentrations.

In light of the above, the production of quartz glass for use in the vacuum ultraviolet region is preferably carried out via the soot technique, which is able to minimize the formation of Si—OH bonds; that is, by a process in which silica soot is generated and deposited to form a porous silica matrix, which is then fused and vitrified. However, in synthetic quartz glass production using only the soot technique, many Si—Si bonds form at a hydroxyl group concentration lower than a few tens of parts per million, resulting in a very large absorption near 163 nm. For this reason, prior-art synthetic quartz glass production processes have included post-treatment steps such as hydrogen annealing of the Si—Si bonds that have formed to convert them to less deleterious structures such as Si—H bonds.

SUMMARY OF THE INVENTION

It is therefore an object of the invention to provide a process for producing synthetic quartz glass, which process allows the formation of Si—Si bonds to be suppressed, reduces or eliminates the need to repair defect structures by post-treatment following synthetic quartz glass production, and is capable of producing synthetic quartz glass having a high transmittance in the vacuum ultraviolet light region. Another object of the invention is to provide synthetic quartz glass produced by such a process.

We have found that if a stoichiometric excess of oxygen is established in the gas balance during creation of the porous silica matrix in the synthetic quartz glass production process, the formation of Si—Si bonds in the quartz glass can be suppressed. It is then possible to produce a synthetic quartz glass having a high transmittance in the vacuum ultraviolet region.

Accordingly, the invention provides a process for producing synthetic quartz glass, comprising the steps of feeding to a reaction zone a silica-forming raw material gas and a fluorine compound gas from a first nozzle at the center of a burner having a plurality of concentric nozzles, oxygen gas from a second nozzle disposed concentrically outside the center nozzle, and oxygen gas or hydrogen gas or both from a third nozzle disposed concentrically outside the second nozzle; flame hydrolyzing the silica-forming raw material gas in the reaction zone to form fine particles of silica; depositing the silica fine particles on a rotatable substrate in the reaction zone so as to create a porous silica matrix; and fusing the silica matrix.

In a first embodiment of the invention, the oxygen gas fed from the second nozzle is set at a flow rate with respect to the raw material gas flow rate which represents a 1.1- to 3.5-fold stoichiometric excess of oxygen.

In a second embodiment of the invention, the oxygen gas is fed from the burner at an overall flow rate with respect to the sum of the raw material gas flow rate and the overall hydrogen gas flow rate which represents a 1.1- to 3.5-fold stoichiometric excess of oxygen. In the second embodiment, the oxygen gas fed from the second nozzle is preferably set at a flow rate with respect to the raw material gas flow rate which represents a 1.1- to 3.5-fold stoichiometric excess of oxygen.

The porous silica matrix in the foregoing processes of the invention preferably has a density of 0.1 to 1.0 g/cm$^3$.

The invention further provides a synthetic quartz glass produced by fusing and vitrifying the porous silica matrix according to either of the foregoing processes of the invention. The synthetic quartz glass has a hydroxyl group concentration of at most 20 ppm and a fluorine atom concentration of at least 100 ppm.

BRIEF DESCRIPTION OF THE DIAGRAMS

FIG. 2 is a graph of vacuum ultraviolet light transmittance plots for synthetic quartz glasses produced in Examples 1 and 2 and Comparative Examples 1 and 2.

DETAILED DESCRIPTION OF THE INVENTION

Figure 1:
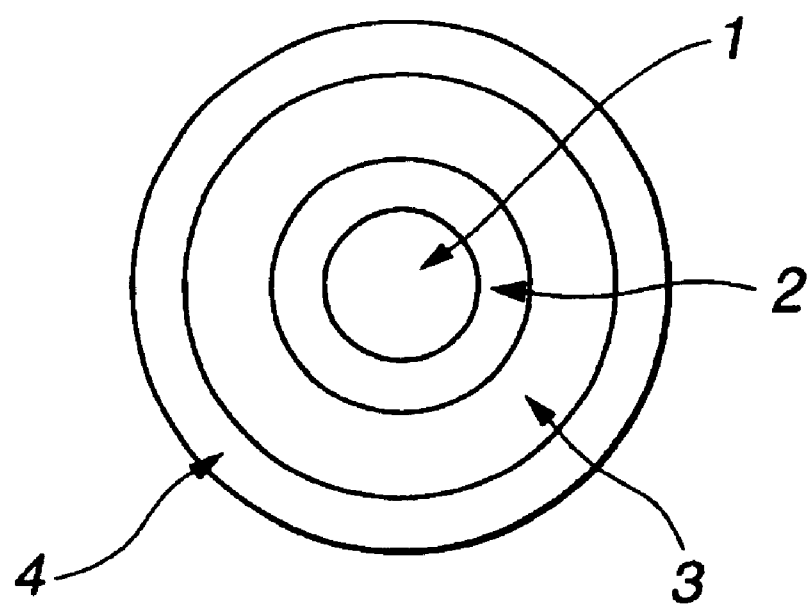
FIG. 1 is schematic cross-sectional view showing an example of a burner which is used to form a porous silica matrix according to the process of the invention.

The inventive process for producing synthetic quartz glass uses a burner having a plurality of concentric nozzles including a first or center nozzle at the center of the burner and second, third and further outer nozzles disposed concentrically outside the center nozzle. A silica-forming raw material gas and a fluorine compound gas are fed to a reaction zone from the first nozzle. In addition, an oxygen gas is fed to the reaction zone from the second nozzle, and oxygen gas and/or hydrogen gas are fed to the reaction zone from the third nozzle. The silica-forming raw material gas is flame-hydrolyzed in the reaction zone to form fine particles of silica, which particles are deposited onto a substrate that is rotatably disposed in the reaction zone, thereby creating a porous silica matrix. The resulting silica matrix is fused to give a quartz glass.

This process is per se known, and may be carried out in accordance with conventional practice using a known organosilicon compound as the silica-forming raw material.

Specific examples of organosilicon compounds that may be used as the raw material include chlorosilane compounds such as tetrachlorosilane ($SiCl_4$) and dimethyldichlorosilane (($CH_3$)$_2SiCl_2$), as well as silane and siloxane compounds of general formulas (I) to (III) below.

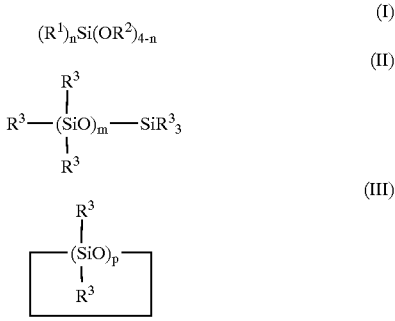

In formulas (I) to (III), $R^1$ and $R^2$ are each independently aliphatic monovalent hydrocarbon groups; $R^3$ is a hydrogen atom or an aliphatic monovalent hydrocarbon group; the letter n is an integer from 0 to 3; m is an integer of at least 1, and preferably 1 or 2; and p is an integer from 3 to 5.

Illustrative examples of aliphatic monovalent hydrocarbon groups represented by $R^1$, $R^2$ and $R^3$ include $C_{1-4}$ alkyl groups such as methyl, ethyl, propyl, n-butyl and tert-butyl; $C_{3-6}$ cycloalkyl groups such as cyclohexyl; and $C_{2-4}$ alkenyl groups such as vinyl and allyl.

Specific examples of silane compounds of above formula (I) include $Si(OCH_3)_4$, $Si(OCH_2CH_3)_4$ and $CH_3Si(OCH_3)_3$.

An exemplary siloxane compound of above formula (II) is hexamethyldisiloxane. Of the above compounds, an alkoxysilane containing no chlorine is preferable for avoiding ultraviolet light absorption by Si—Cl bonds.

Examples of suitable fluorine compounds include tetrafluorosilane, trifluoromethane and tetrafluoromethane.

The burner used in the invention has a plurality of concentrically arranged nozzles. Use may be made of any known burner of this type which is capable of supporting flame hydrolysis by feeding to a reaction zone a silica-forming raw material gas and a fluorine compound gas from the center nozzle, feeding oxygen gas from a second nozzle located outside the center nozzle, and feeding oxygen gas and/or hydrogen gas from one or more nozzles located outside of the second nozzle. FIG. 1 shows a typical burner suitable for use in working the invention.

Referring to FIG. 1, a center tube nozzle 1 feeds silica-forming raw material gas and fluorine compound gas, and a first ring tube 2 (also referred to herein as the "second nozzle") surrounding the center tube nozzle 1 feeds oxygen gas. In addition, a second ring tube 3 surrounding the first ring tube 2 feeds hydrogen gas, and a third ring tube 4 surrounding the second ring tube 3 feeds oxygen gas.

It is a distinctive feature of the invention for the oxygen gas fed from the second nozzle 2 to be set at a flow rate with respect to the flow rate of raw material gas which represents a 1.1- to 3.5-fold, and preferably a 1.5- to 2.5-fold, excess of oxygen relative to the stoichiometric ratio. Alternatively, or in addition, the overall flow rate of oxygen gas from the burner with respect to the sum of the raw material gas flow rate and the overall hydrogen gas flow rate is set such as to represent a 1.1- to 3.5-fold, and preferably a 1.5- to 2.5-fold, excess of oxygen relative to the stoichiometric ratio.

The concepts of "stoichiometric ratio" and "stoichiometric excess" as they relate to the inventive process are described. For the purpose of illustration, the raw material shall be assumed to be tetramethoxysilane. The conversion of tetramethoxysilane to fine particles of silica in an oxy-hydrogen flame takes place via reactions (i) and (ii) below.

$$(CH_3O)_4Si + 6O_2 \longrightarrow SiO_2 + 6H_2O + 4CO_2 \quad (i)$$

$$H_2 + 1/2O_2 \longrightarrow H_2O \quad (ii)$$

In this case, the flow rate of oxygen from the second nozzle relative to the flow rate of the raw material gas is stoichiometric when 6.0 moles of oxygen gas is fed from the second nozzle per mole of the raw material gas. These relative flow rates between the two gases are said to be in a "stoichiometric ratio," and the amount of oxygen supplied from the second nozzle with respect to the raw material gas can be referred to as 1.0 times the stoichiometric ratio.

When 12.0 moles of oxygen gas is fed from the second nozzle per mole of the raw material (tetramethoxysilane) gas, the amount of oxygen thus supplied is 2.0 times the stoichiometric ratio, representing a 2.0-fold stoichiometric excess of oxygen. This can be expressed by the formula:

$$X = A/6B \quad (1),$$

wherein X is the ratio of the flow rate of oxygen gas fed from the second nozzle expressed as a multiple of the stoichiometric ratio; A is the flow rate, in moles per hour (mol/h), of oxygen gas fed from the second nozzle; and B is the flow rate (mol/h) of the raw material gas.

Similarly, the overall flow rate of oxygen gas with respect to the sum of the raw material gas flow rate and the overall hydrogen gas flow rate can be expressed by the formula:

$$Y = C/(6B + 0.5D) \tag{2}$$

wherein Y is the ratio of the overall flow rate of oxygen gas fed from the burner to the sum of the raw material gas flow rate and the overall hydrogen gas flow rate expressed as a multiple of the stoichiometric ratio; C is the overall flow rate (mol/h) of oxygen gas fed from the burner; B is the flow rate (mol/h) of raw material gas; and D is the overall flow rate (mol/h) of hydrogen gas fed from the burner.

To illustrate, in the burner example shown in FIG. 1, C is the sum of the flow rates of oxygen gas fed from the first and third ring tubes 2 and 4, and D is the flow rate of hydrogen gas fed from the second ring tube 3. It should also be noted that above computational formulas (1) and (2) apply to a case in which tetramethoxysilane is used as the raw material gas. If another raw material gas is used, formulas (1) and (2) will have to be corrected as appropriate to reflect the reactions that take place with that raw material.

The objects and advantages of the invention are attainable by having the molar ratio between the flow rate of oxygen gas fed from the second nozzle to the raw material gas flow rate, or the molar ratio between the overall flow rate of oxygen gas from the burner to the sum of the raw material gas flow rate and the overall hydrogen gas flow rate, represent a condition of excess oxygen supply (stoichiometric excess of oxygen). Having both ratios represent conditions of excess oxygen supply can be even more advantageous.

If necessary, an inert gas such as argon, nitrogen or helium may be fed from the center nozzle or, along with oxygen gas, from the second nozzle of the burner. Use may also be made of a plurality of burners, including one or more auxiliary burner, in which case the auxiliary burner may supply only an oxyhydrogen flame or may supply a fluorine compound gas.

In the practice of the invention, aside from controlling the flow rate of oxygen gas as described above, synthetic quartz glass can be produced by conventional flame hydrolysis. The feed rate of raw material gas in this case is typically set within a range of 4 to 40 mol/h.

The porous silica matrix formed in the process described above is vitrified in a high-temperature glassmaking furnace. Vitrification may be carried out using a known method and conditions, such as heating in a vacuum to a temperature of 1,200 to 1,700° C. Instead of a vacuum, the furnace may have an inert gas (e.g., helium, argon) atmosphere. Following vitrification, the furnace interior is cooled to room temperature, either by rapid or gradual cooling.

To facilitate the vitrifying reaction, it is preferable for the porous silica matrix to have a density of 0.1 to 1.0 g/m³, and especially 0.2 to 0.5 g/cm³.

The synthetic quartz glass produced as described above has a hydroxyl group concentration of preferably not more than 20 ppm. Above 20 ppm, the undesirable effects of Si—OH bonds, which absorb radiation near 160 nm, may be too large. The porous silica matrix is produced by feeding a fluorine compound such as $SiF_4$, $CHF_3$ or $CF_4$ together with the raw material gas from a raw material gas feeder in the burner. It is preferable for the fluorine atom concentration within the resulting synthetic quartz glass to be at least 100 ppm. At a fluorine atom concentration of below 100 ppm, the hydroxyl group concentration may exceed 20 ppm, resulting in a larger than desirable influence by Si—OH bonds.

EXAMPLES

Examples of the invention are given below by way of illustration, and not by way of limitation. Nor should the gas flow rate or other production conditions used in the examples be understood as restrictive of the invention. The burner used in the examples is that shown in FIG. 1.

Example 1

A porous silica matrix having a density of 0.25 g/cm³ was produced using tetramethoxysilane as the raw material. The oxygen flow rate from the second nozzle 2 with respect to the raw material gas flow rate was set at 1.96 times the stoichiometric ratio, and the overall oxygen gas flow rate with respect to the sum of the raw material gas flow rate and the overall hydrogen gas flow rate was set at 2.43 times the stoichiometric ratio. During formation of the porous silica matrix, tetrafluorosilane was fed from the center nozzle 1 of the burner at a flow rate of 1.3 mol/h.

The resulting porous silica matrix was heated to a temperature of 1,500° C. in a helium atmosphere, giving a synthetic quartz glass. Vitrification took 30 hours. The hydroxyl group concentration was 0 ppm, and the fluorine atom concentration was 1,540 ppm. Measurement of light transmittance in the vacuum ultraviolet region indicated that absorption from 160 to 240 nm was very weak, and that transmittance at 157.6 nm was as high as 78.0%. Table 1 gives the gas balance during formation of the porous silica matrix, and the physical properties of the synthetic quartz glass produced. A plot of the transmittance is shown in FIG. 2. The samples used to measure transmittance in this and the subsequent examples had a thickness of 6.3±0.1 mm.

Example 2

A porous silica matrix having a density of 0.30 g/cm³ was produced using tetramethoxysilane as the raw material. The oxygen flow rate from the second nozzle 2 with respect to the raw material gas flow rate was set at 3.03 times the stoichiometric ratio, and the overall oxygen gas flow rate with respect to the sum of the raw material gas flow rate and the overall hydrogen gas flow rate was set at 3.42 times the stoichiometric ratio. During formation of the porous silica matrix, tetrafluorosilane was fed from the center nozzle 1 of the burner at a flow rate of 0.4 mol/h.

The resulting porous silica matrix was heated to a temperature of 1,500° C. in a vacuum, giving a synthetic quartz glass. Vitrification took 30 hours. The hydroxyl group concentration was 5 ppm, and the fluorine atom concentration was 740 ppm. Measurement of light transmittance in the vacuum ultraviolet region indicated that absorption due to Si—Si bonds and Si—OH bonds was very weak, and that transmittance at 157.6 nm was as high as 74.8%. Table 1 gives the gas balance during formation of the porous silica matrix, and the physical properties of the synthetic quartz glass produced. A plot of the transmittance is shown in FIG. 2.

Comparative Example 1

A porous silica matrix having a density of 0.20 g/cm³ was produced using tetramethoxysilane as the raw material. The oxygen flow rate from the second nozzle 2 with respect to the raw material gas flow rate was set at 0.91 times the stoichiometric ratio, and the overall oxygen gas flow rate with respect to the sum of the raw material gas flow rate and the overall hydrogen gas flow rate was set at 0.98 times the stoichiometric ratio. During formation of the porous silica matrix, tetrafluorosilane was fed from the center nozzle 1 of the burner at a flow rate of 1.3 mol/h.

The resulting porous silica matrix was heated to a temperature of 1,500° C. in a vacuum, giving a synthetic quartz glass. Vitrification took 30 hours. The hydroxyl group concentration was 0 ppm, and the fluorine atom concentration was 1,610 ppm. Measurement of light transmittance in the vacuum ultraviolet region indicated strong absorption near 163 nm. Transmittance at 157.6 nm was as low as 15.6%. Table 1 gives the gas balance during formation of the porous silica matrix, and the physical properties of the synthetic quartz glass produced. A plot of the transmittance is shown in FIG. 2.

Comparative Example 2

A porous silica matrix having a density of 0.20 g/cm$^3$ was produced using tetramethoxysilane as the raw material. The oxygen flow rate from the second nozzle 2 with respect to the raw material gas flow rate was set at 0.91 times the stoichiometric ratio, and the overall oxygen gas flow rate with respect to the sum of the raw material gas flow rate and the overall hydrogen gas flow rate was set at 0.98 times the stoichiometric ratio. During formation of the porous silica matrix, tetrafluorosilane was fed from the center nozzle 1 of the burner at a flow rate of 0.3 mol/h.

The resulting porous silica matrix was heated to a temperature of 1,500° C. in a vacuum, giving a synthetic quartz glass. Vitrification took 15 hours. The hydroxyl group concentration was 60 ppm, and the fluorine atom concentration was 630 ppm. Measurement of light transmittance in the vacuum ultraviolet region indicated strong absorption near 160 nm. Transmittance at 157.6 nm fell to 0%. Table 1 gives the gas balance during formation of the porous silica matrix, and the physical properties of the synthetic quartz glass produced. A plot of the transmittance is shown in FIG. 2.

TABLE 1

|  | Example 1 | Example 2 | Com. Ex. 1 | Com. Ex. 2 |
|---|---|---|---|---|
| O$_2$ ratio[1] | 1.96 | 3.03 | 0.91 | 0.91 |
| O$_2$ ratio[2] | 2.43 | 3.42 | 0.98 | 0.98 |
| OH concentration (ppm) | 0 | 5 | 0 | 60 |
| F concentration (ppm) | 1,540 | 740 | 1,610 | 630 |

[1]Ratio of oxygen flow rate from second nozzle to raw material gas flow rate, expressed as a multiple of the stoichiometric ratio and calculated from formula (1) above.
[2]Ratio of overall oxygen flow rate to sum of raw material gas flow rate and overall hydrogen gas flow rate, expressed as a multiple of the stoichiometric ratio and calculated from formula (2) above.

By setting the gas balance during porous silica matrix formation to a stoichiometric excess of oxygen, the inventive process effectively suppresses the formation of Si—Si bonds in the quartz glass, making it possible to produce synthetic quartz glass having a high transmittance in the vacuum ultraviolet region.

Japanese Patent Application No. 11-371458 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A process for producing synthetic quartz glass, comprising the steps of:
    feeding to a reaction zone a silica-forming raw material gas and a fluorine compound gas from a first nozzle at the center of a burner having a plurality of concentric nozzles, oxygen gas from a second nozzle disposed concentrically outside the center nozzle, and oxygen gas or hydrogen gas or both from a third nozzle disposed concentrically outside the second nozzle,
    flame hydrolyzing the silica-forming raw material gas in the reaction zone to form fine particles of silica,
    depositing the silica fine particles on a rotatable substrate in the reaction zone so as to create a porous silica matrix, and
    fusing the silica matrix;
    wherein the oxygen gas fed from the second nozzle is set at a flow rate with respect to the raw material gas flow rate which represents a 1.1- to 3.5-fold stoichiometric excess of oxygen.
2. A process of claim 1, wherein the porous silica matrix has a density of 0.1 to 1.0 g/cm$^3$.
3. A synthetic quartz glass capable of transmitting ultraviolet light having a wavelength of 157 nm (F$_2$) produced by fusing and vitrifying the porous silica matrix according to the process of claim 1, which synthetic quartz glass has a hydroxyl group concentration of at most 20 ppm and a fluorine atom concentration of at least 100 ppm,
    wherein said glass has a transmittance at 157.6 nm of at least 74.8%.
4. A process according to claim 1, wherein said silica-forming raw material is a chlorosilane compound, a silane or siloxane compounds of formulas (I) to (II) below, or mixtures thereof:

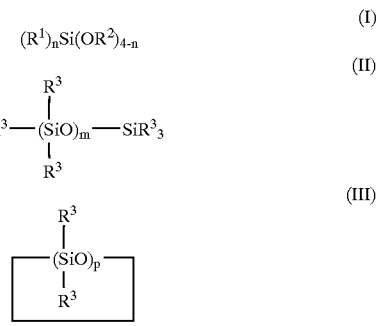

wherein R$^1$ and R$^2$ are each independently an aliphatic monovalent hydrocarbon group; R$^3$ is a hydrogen atom or an aliphatic monovalent hydrocarbon group; the letter n is an integer from 0 to 3; m is an integer of at least I; and p is an integer from 3 to 5.
5. A process according to claim 4, wherein R$^1$ and R$^2$ are each independently C$_{1-4}$ alkyl, C$_{3-6}$ cycloalkyl, or C$_{2-4}$ alkenyl and R$^3$ is H, C$_{1-4}$ alkyl, C$_{3-6}$ cycloloalkyl, or C$_{1-4}$ alkenyl.
6. A process according to claim 1, wherein said silica-forming raw material SiCl$_4$, (CH$_3$)$_2$SiCl$_2$, Si(OCH$_2$CH$_3$)$_4$, CH$_3$ Si(OCH$_3$)$_3$, hexamethyldisiloxane, tetrafluorosilane, trifluoromethan, tetrafluoromethane or mixtures thereof.
7. A process according to claim 1, wherein the oxygen gas fed from the second nozzle flows at a flow rate with respect to the flow rate of raw material gas which represents a 1.5- to 2.5-fold stoichiometric excess of oxygen.
8. A process according to claim 1, wherein the oxygen gas is fed from the burner at an overall flow rate with respect to the sum of the raw material gas flow rate and the overall hydrogen gas flow rate which represents a 1.5- to 2.5-fold stoichiometric excess of oxygen.
9. A process according to claim 1, wherein feed rate of raw material gas in is 4 to 40 mol/h.
10. A process of claim 1, wherein the porous silica matrix has a density of 0.2 to 0.5 g/cm$^3$.

11. A process for producing synthetic quartz glass, comprising the steps of:

feeding to a reaction zone a silica-forming raw material gas and a fluorine compound gas from a first nozzle at the center of a burner having a plurality of concentric nozzles, oxygen gas from a second nozzle disposed concentrically outside the center nozzle, hydrogen gas from a third nozzle disposed concentrically outside the second nozzle, and oxygen gas from a fourth nozzle disposed concentrically outside the third nozzle.

flame hydrolyzing the silica-forming raw material gas in the reaction zone to form fine particles of silica, depositing the silica fine particles on a rotatable substrate in the reaction zone so as to create a porous silica matrix, and fusing the silica matrix;

wherein the oxygen gas is fed from the burner at an overall flow rate with respect to the sum of the raw material gas flow rate and the overall hydrogen gas flow rate which represents a 1.1- to 3.5-fold stoichiometric excess oxygen.

12. A process of claim 11, wherein the porous silica matrix has a density of 0.1 to 1.0g/cm$^3$.

13. A process of claim 12, wherein the porous silica matrix has a density of 0.2 to 0.5g/cm$^3$.

14. A synthetic quartz glass capable of transmitting ultraviolet light having a wavelength of 157 nm ($F_2$) produced by fusing and vitrifying the porous silica matrix according to the process of claim 11, which synthetic quartz glass has a hydroxyl group concentration of at most 20ppm and fluorine atom concentration of at least 100 ppm.

wherein said glass has a transmittance at 157.6 nm of at least 74.8%.

15. A process for producing synthetic quartz glass comprising:

feeding to a reaction zone a silica-forming raw material gas and a fluorine compound gas from a first nozzle at the center of a burner having a plurality of concentric nozzles, oxygen gas from a second nozzle disposed concentrically outside the center nozzle, hydrogen gas from a third nozzle disposed concentrically outside the second nozzle, and oxygen gas from a fourth nozzle disposed concentrically outside the third nozzle, flame hydrolyzing the silica-forming raw material gas in the reaction zone to form fine particles of silica, depositing the silica fine particles on a rotatable substrate in the reaction zone so as to create a porous silica matrix, and fusing the silica matrix;

wherein the oxygen gas fed from the second nozzle is set at a flow rate with respect to the raw material gas flow rate which represents a 1.1- to 3.5-fold stoichiometric excess of oxygen, and the oxygen gas is fed from the burner at an overall flow rate with respect to the sum of the raw material gas flow rate and the overall hydrogen gas flow rate which represents a 1.1-to 3.5-fold stoichiometric excess of oxygen.

16. A process of claim 15, wherein the porous silica matrix has a density of 0.1 to 1.0g/cm$^3$.

17. A process of claim 16, wherein the porous silica matrix has a density of 0.2 to 0.5g/cm$^3$.

18. A synthetic quartz glass capable of transmitting ultraviolet light having a wavelength of 157 nm ($F_2$)produced by fusing and vitrifying the porous silica matrix according to the process of claim 15, which synthetic quartz glass has a hydroxyl group concentration of at most 20 ppm and fluorine atom concentration of at least 100 ppm.

wherein said glass has a transmittance at 157.6 nm of at least 74.8%.

\* \* \* \* \*